US008571955B2

(12) United States Patent
Al Faruque et al.

(10) Patent No.: US 8,571,955 B2
(45) Date of Patent: Oct. 29, 2013

(54) AGGREGATOR-BASED ELECTRIC MICROGRID FOR RESIDENTIAL APPLICATIONS INCORPORATING RENEWABLE ENERGY SOURCES

(75) Inventors: Mohammad Abdullah Al Faruque, Plainsboro, NJ (US); Livio Dalloro, Princeton, NJ (US); Hartmut Ludwig, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/276,392

(22) Filed: Oct. 19, 2011

(65) Prior Publication Data
US 2013/0046668 A1   Feb. 21, 2013

Related U.S. Application Data

(60) Provisional application No. 61/524,895, filed on Aug. 18, 2011.

(51) Int. Cl.
G06Q 40/00 (2012.01)
G06Q 50/06 (2012.01)
G06Q 30/02 (2012.01)

(52) U.S. Cl.
CPC ............... *G06Q 40/00* (2013.01); *G06Q 50/06* (2013.01); *G06Q 30/0206* (2013.01)
USPC .......................................... 705/35; 705/412

(58) Field of Classification Search
CPC .... G06Q 40/00; G06Q 50/06; G06Q 30/0206
USPC .................................................. 705/35, 412
See application file for complete search history.

(56) References Cited

U.S. PATENT DOCUMENTS

| | | | |
|---|---|---|---|
| 5,479,358 A | 12/1995 | Shimoda et al. | |
| 7,274,975 B2 * | 9/2007 | Miller | 700/295 |
| 7,460,931 B2 | 12/2008 | Jacobson | |
| 7,478,070 B2 | 1/2009 | Fukui et al. | |
| 7,612,466 B2 | 11/2009 | Skutt | |
| 2005/0125243 A1 | 6/2005 | Villalobos | |
| 2006/0241951 A1 | 10/2006 | Cynamom et al. | |
| 2007/0219932 A1 * | 9/2007 | Carroll et al. | 705/412 |
| 2009/0043519 A1 | 2/2009 | Bridges et al. | |
| 2009/0048716 A1 | 2/2009 | Marhoefer | |

(Continued)

OTHER PUBLICATIONS

Marhoefer, J. J. (2008). Intelligent generation(TM): The smart way to build the smart grid. Natural Resources & Environment, 23(1), 19-24. Retrieved Sep. 6, 2013.*

(Continued)

*Primary Examiner* — Kito R Robinson

(57) ABSTRACT

A residential electric grid (microgrid) is proposed as a distribution arrangement between a utility company and a group of individual residential consumers. The residential consumers are also viewed as "producers" of renewable energy and are defined as "prosumers". An aggregator is used at the microgrid to negotiate with the utility on behalf of the group of prosumers, commanding a better price for excess electricity sold back to the utility (especially as part of a Demand Response (DR) program). Importantly, the microgrid is constructed to include energy storage capability at the microgrid. Therefore, the arrangement is capable of supplying power to the residential customers in the event of an outage at the macrogrid level, and also selling back the electricity to the utility as part of a DR program.

8 Claims, 4 Drawing Sheets

(56) References Cited

U.S. PATENT DOCUMENTS

| | | |
|---|---|---|
| 2009/0066287 A1* | 3/2009 | Pollack et al. ............... 320/101 |
| 2009/0200988 A1* | 8/2009 | Bridges et al. ............... 320/137 |
| 2009/0326726 A1 | 12/2009 | Ippolito et al. |
| 2010/0121700 A1* | 5/2010 | Wigder et al. ............. 705/14.25 |
| 2010/0217549 A1* | 8/2010 | Galvin et al. ................... 702/62 |
| 2010/0293045 A1* | 11/2010 | Burns et al. ................ 705/14.11 |
| 2011/0276194 A1* | 11/2011 | Emalfarb et al. ............. 700/297 |
| 2012/0130556 A1* | 5/2012 | Marhoefer ................... 700/291 |
| 2012/0239558 A1* | 9/2012 | Zhang ............................. 705/39 |

OTHER PUBLICATIONS

Sahley, "Electric Consumer Aggregation Options: An Introductory guide for Non-Profits, Local Governments, and Community Leaders", May 2001, Green Energy Ohio, pp. 1-75.

\* cited by examiner

AGGREGATOR-BASED ELECTRIC MICROGRID FOR RESIDENTIAL APPLICATIONS INCORPORATING RENEWABLE ENERGY SOURCES

CROSS-REFERENCE TO RELATED APPLICATIONS

This application claims the benefit of U.S. Provisional Application No. 61/524,895, filed Aug. 18, 2011 and herein incorporated by reference.

TECHNICAL FIELD

The present invention relates to an electric microgrid suitable for implementation in the residential environment and, more particularly, to the utilization of an aggregator within the microgrid as an intermediary between a group of residential electric power customers (the customers also producers of renewable energy) and the electric utility supplier.

BACKGROUND OF THE INVENTION

Worldwide demand for energy has recently begun to increase at an accelerating rate due, in part, to increased consumption by developing economies such as China, India and the region of Southeast Asia. This increased demand, primarily for fossil fuel energy, has resulted in pressures on energy delivery and supply systems, leading to sharply increased energy prices. These higher fossil fuel prices may, in turn, result in increased electricity prices to consumers due to the extensive use of fossil fuels in electrical generating plants.

Moreover, electrical generation and distribution systems in the United States have come under increasing pressure due to increased use of electricity and increased peak demand. Electric utilities have been forced to develop load management strategies to minimize supply disruptions during periods of high demand. Environmental concerns and energy price volatility have also become significant factors impacting power distribution, spurring the development of renewable sources of energy and encouraging residential consumers to become active participants in the generation of renewable energy.

Indeed, all of these factors are now moving the power industry away from the legacy power infrastructure system (where electricity only flows from the generation site to the distribution site) to a more intelligent power network where a bi-directional flow of electricity is managed by an associated communication network, working together to improve the efficiency and economy of power distribution. The communication network provides messaging between various components of the power network (generators, transmission links, distribution networks, end-user appliances, 'smart' power meters, etc.) so as to create an optimized power network/grid (often referred to in the art as a "smart grid").

There is also a paradigm shift underway in the energy market from an integrated (monopoly) model to a more competitive model, the competitive model introducing an intermediary in the form of an "aggregator" as an interface between consumers and utility companies. In the integrated model, the generation, transmission and distribution of electricity is controlled within a well-bounded geographical area by a local utility company. This type of utility company is commonly referred to as a vertically-integrated utility.

The more competitive model beginning to emerge is partitioned between a number of separate and distinct entities: a power generation company, a market operating company, a transmission system operating company, distributors and retailers. This market change has been encouraged to achieve lower power system operation cost and higher efficiency, as well as offering the consumer the opportunity to proactively become involved through flexible choice options.

For the purposes of explaining the subject matter of the present invention it will be presumed that there are two major operational domains in this competitive model: (1) the market domain and (2) the network domain. (It is to be understood that while this presumption is valid in many situations, there remains a component of the electricity market where a single entity is responsible for generation, distribution and retail marketing (billing, etc.), falling into both the market domain and the network domain.) Within the market domain, the power generation companies make a bid to supply a certain amount of electricity at a selected price. The wholesale market operating company receives the bids from a number of generation companies, ranks them and then accepts enough bids to satisfy the forecasted demand (with a safety margin). The retailers then purchase electricity from the wholesale market operating companies at spot prices and sell retail electricity to their customers/consumers. With competition at the retail level, consumers can change suppliers when they are offered a better retail price.

Within the network domain, the transmission system operating company is primarily responsible for operating and ensuring the security of the transmission network. As such, the transmission system operating company is not involved in the "marketing" of electricity and its role in generation is limited to ensuring that the submitted schedules are within the transmission network security margins. Similarly, distributors are responsible for managing and maintaining related distribution networks via substation transformers and are not involved in the buying and selling of power. Distributors are also responsible for meter reading at the consumer's location and then communicating this information to the proper retailer for billing purposes.

Over the last few years, several innovative applications have been proposed within the larger scope of the "smart grid" as outlined above, based on the requirements of different market domains, such as commercial/industrial facilities, critical government facilities (e.g., military), and the like. One application in particular is referred to as a "microgrid", which is defined for the purposes of the present invention as a localized grouping of electricity sources and loads that normally operate connected to—and synchronous with—a traditional, centralized grid (defined as a "macrogrid"), but can disconnect and function autonomously as physical and/or economic conditions dictate.

Furthermore, in the scope of successful deployment of smart grid applications, several initiatives to bring aggregators into the network model have been developed. For the most part, aggregators are treated as "electric service suppliers" that provide a related group of consumers with a broad category of innovative services including, perhaps, collecting a group of consumers into a single purchasing unit to negotiate the purse of electricity in the energy market. Also, these aggregators may function to negotiate "Demand Response" (DR). Demand Response is a program that seeks to reduce peak load in exchange for offering financial incentives to the consumer; that is, requesting the consumer to reduce their consumption during peak load conditions. In general, the aggregator business model has been proven successful in only the commercial/industrial market, where the amount of energy savings through DR during peak load time has been found to be significant.

While various new business models and features have been successful in providing economy to commercial/industrial electricity consumers, there has been no similar success in the residential marketplace. The existing aggregators available in the industrial and commercial domain are not interested in working with individual residential consumers, since their electricity consumption (on the order of kWh) is much less and their chance of savings during DR is not profitable for the aggregator. Additionally, residential consumers are not truly motivated to join the DR program, since there are associated up-front costs associated with 'smart' appliances, home automation devices, internal grid structures, and the like.

Thus, a need remains to provide a system architecture suitable for use in the residential environment that presents the benefits of consumer interaction with the electric utility business.

SUMMARY OF THE INVENTION

The needs remaining in the art are addressed by the present invention, which relates to an electric microgrid suitable for implementation in the residential environment and, more particularly, to the utilization of an aggregator within the microgrid as an intermediary between a group of residential electric power customers (which are also capable of generating electricity from renewable sources) and the electric utility supplier. For the purposes of the present invention, a "microgrid" is defined as a localized grouping of electricity sources and loads that normally operate connected to—and synchronous with—a traditional, centralized grid (defined as a "macrogrid"), but can disconnect and function autonomously as physical and/or economic conditions dictate.

For the purposes of the present invention, an aggregator is defined as combining at least the following elements: (1) multiple residential consumers with their in-house renewable electricity generation (as described below, these individuals will be defined as "prosumers", inasmuch as they function as both producers and consumers of electricity; (2) microgrid-based energy storage capability; (3) flexible electricity consumption at the microgrid level (for example, shifting the load through storage); and (4) participation in the energy market through a Demand Response (DR) program. "Renewable electricity generation" is considered to include, but not be limited to, solar, wind, biomass, and the like—all capable of being generated at a residential premise location.

In accordance with the present invention, the utilization of a residential aggregator within a microgrid serving a plurality of residential prosumers allows for the residential prosumers to recognize a higher price for their (collectively) produced renewable electricity and facilitates a better negotiating position with the utility companies. Moreover, by including energy storage capability at the microgrid itself, the arrangement is capable of supplying power to the residential customers in the event of an outage at the macrogrid level and/or selling the electricity back to the utility as part of a DR program. Additional benefits in terms of installing microgrid-based renewable sources (for use by the prosumers and/or to create electricity to sell back to the utility) are also contemplated. The larger size of the aggregator (with respect to the individual residential prosumers) thus allows for the aggregator to obtain financial benefits for the residential prosumer beyond what the individual would be able to do.

Other and further features and advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

The present invention proposes a model of an electric microgrid for the residential distribution domain, utilizing an aggregator to provide localized energy storage and coordination among a group of residential "prosumers" connected to the microgrid for intelligent bi-directional electricity usage, where a "prosumer" is defined as an individual (residential individual) that both consumes and produces electricity. In accordance with the present invention, it is presumed that a significant number of the residences connected to the microgrid are capable of generating electricity from renewable resources (e.g., solar, wind, biomass); however, the benefits of the aggregator-based microgrid are applicable (to a lesser degree) to a traditional residential consumer as well as a residential prosumer. As will be discussed below, the economic benefits available to the residential prosumer in this aggregator-microgrid model serves to further encourage the installation of additional renewable energy sources.

In particular, the aggregator-based electric microgrid of the present invention generates a direct economic benefit for the residential prosumer by ultimately allowing the aggregator to offer a better price to a utility for the renewable electricity produced by residential individuals. That is, the residential aggregator, from its position of "large" energy consumer, is able to both negotiate better electricity prices with utilities and more effectively leverage existing energy market offerings such as Demand Response (DR) programs.

Figure 1:
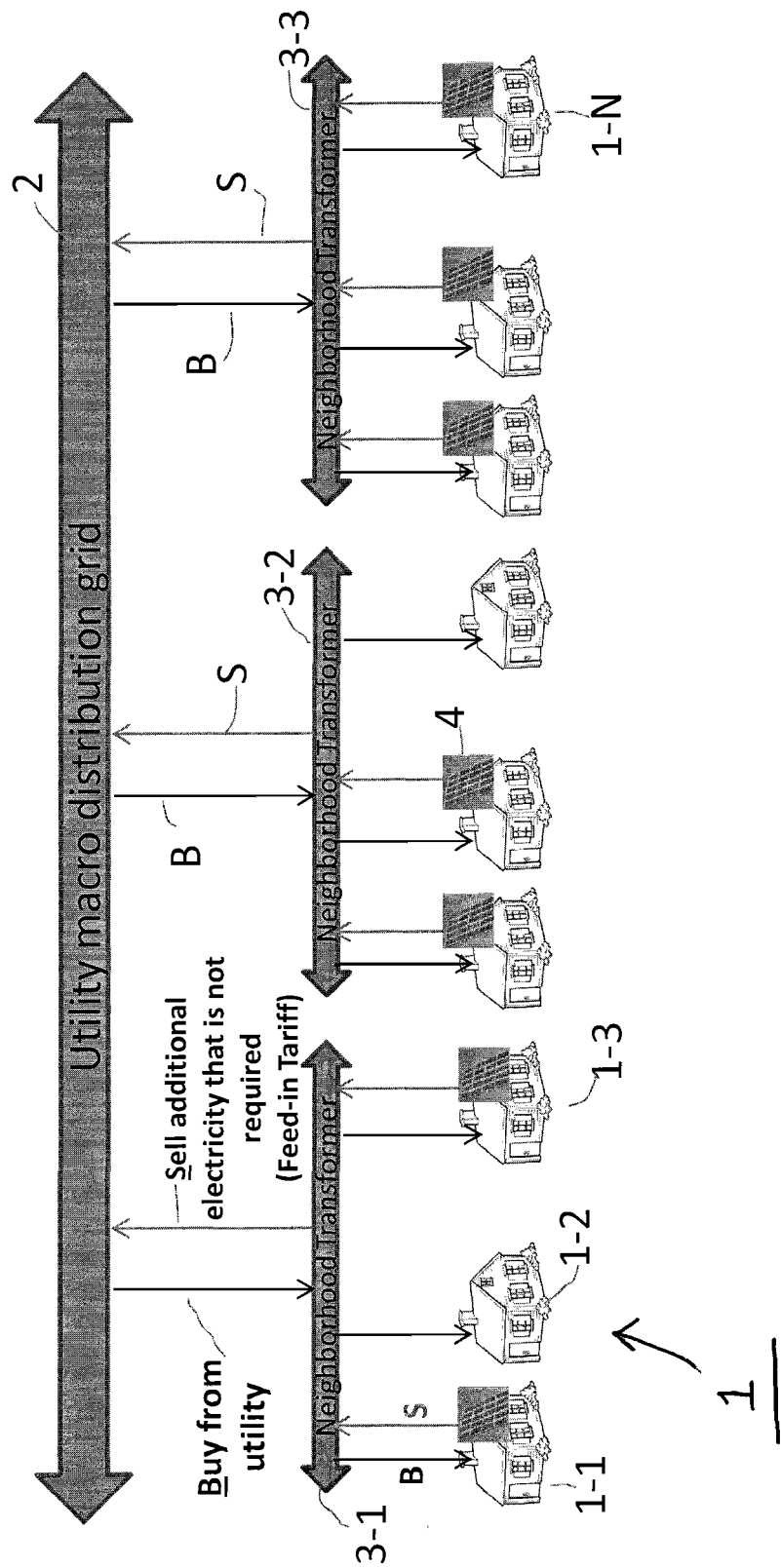
FIG. 1 is a simplified diagram of a conventional prior art arrangement for distributing power between a utility macrogrid and a plurality of residential customers.

Prior to describing the details of the arrangement of the present invention, an illustration of the current residential electricity distribution system will be briefly reviewed, with respect to FIG. 1. In the diagram of FIG. 1, a plurality of residential customers 1-1, 1-2, . . . 1-N are shown as receiving electricity from (and, in limited form, selling energy to) a utility distribution company via a macrogrid 2. In this particular configuration, macrogrid 2 utilizes a set of three neighborhood step-down transformers 3-1, 3-2 and 3-3 to delivery electricity to groups of residential customers 1 in a conventional manner. The down-directed arrows (labeled "B" for buy) illustrate the conventional flow of electricity from distribution macrogrid 2 passing through transformer 3 and into an exemplary residential customer premise **1-*i*, that is, the residential customer is purchasing electricity from the utility company via distribution macrogrid 2**.

A subset of residential customers 1 are defined as including renewable resources 4 (shown for the sake of simplicity as a solar array, with the understanding that wind, biomass or other renewable resources may be used), with the capability of then "selling" excess power back to the utility. The up-directed arrows (labeled "S" for sell) illustrate the opportunity for residential customers to directly sell electricity from their renewable energy sources back to the utility. If additional electricity is produced, it is usually fed into the utility at a pre-defined price (typically less than the cost of buying electricity from the grid). This is defined as a "Feed-in Tariff" (FiT) policy mechanism that has been designed to encourage the adoption of renewable energy. Different tariff rates are typically set for different renewable energy technologies, depending on the cost of resource development in each case. Additionally, the tariff may depend on state and federal regulations, place of installation, size of installation, technology, etc.

To date, the participation of residential renewable energy generators in the energy marketplace has been very limited. The residential customer, as an individual, has not found it economical to participate in a regular basis in this arena, since his production in generally on the order of kWh, and a utility is interested in purchasing electricity on the order of MWh. Additionally, the price at which a utility is willing to buy back electricity from an individual customer is not sufficiently encouraging to motivate the individual to install more renewable sources.

These and various other limitations of the state of the art are addressed by the present invention, which provides an electric microgrid suitable for implementation in the residential environment, including an aggregator within the microgrid that functions as an intermediary between a group of residential electric power prosumers and the electric utility supplier.

Figure 2:
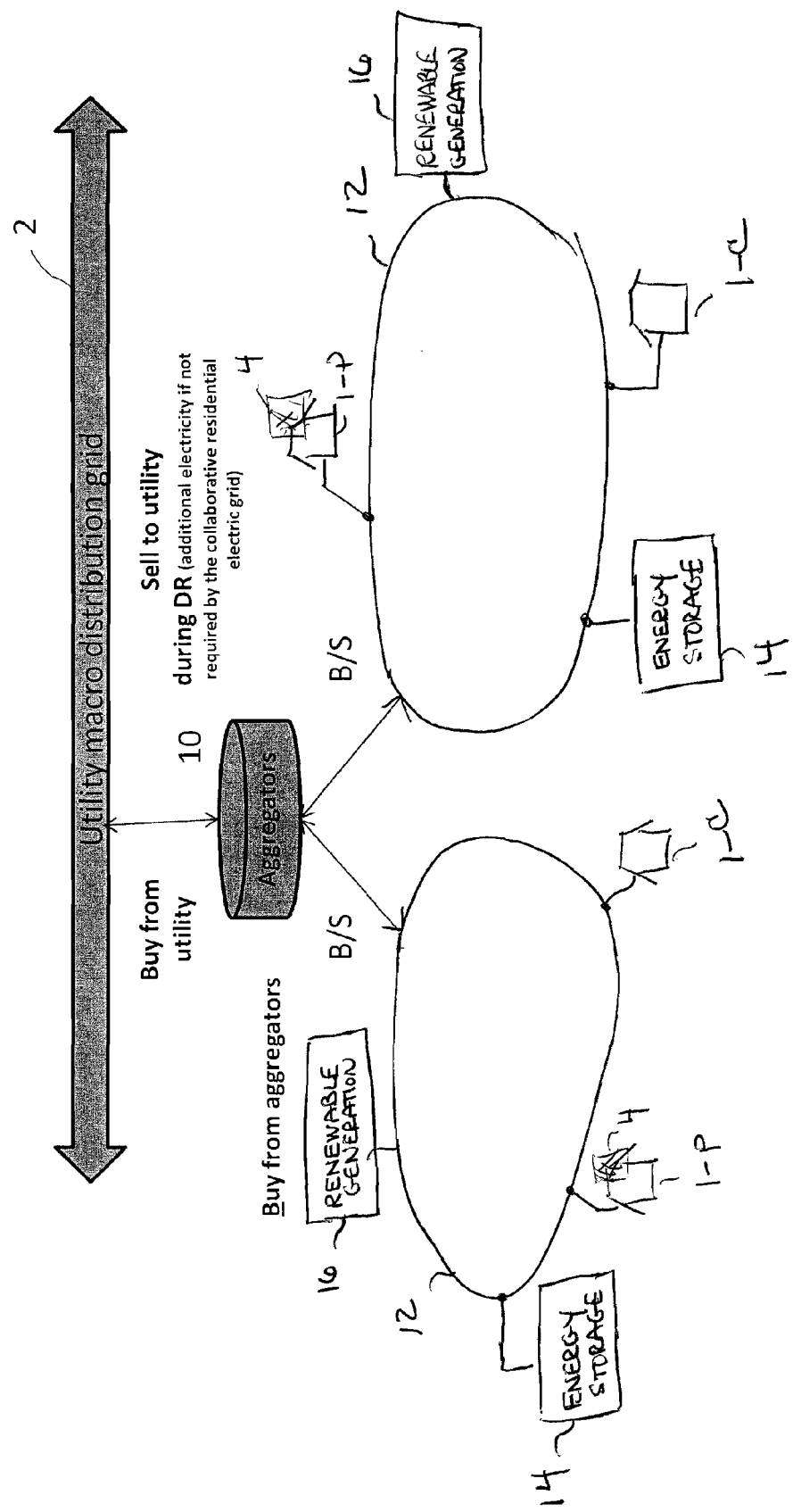
FIG. 2 is a simplified diagram of the arrangement of the present invention, utilizing an aggregator between the utility macrogrid and a plurality of prosumers, forming a microgrid for managing electricity consumption and generation of the prosumers.

FIG. 2 illustrates a system architecture of the arrangement of the present invention, where a residential aggregator 10 is disposed between the utility distribution company macrogrid 2 and a microgrid 12 comprising a plurality of residential customers 1 (for the sake of clarity, transformers 3 are not specifically shown in this view, but are understood as utilized to provide the proper voltage levels to residential customers). In this model, residential aggregator 10 negotiates prices with the utility on behalf of the collected group of residential customers. In turn, the customers purchase their electricity from aggregator 10, selling back renewable energy to aggregator 10. Those residences that also include a generation source of renewable energy (symbolized by solar array 4) are defined as residential prosumers 1-P; the remaining conventional residential customers are shown by reference numeral 1-C in FIG. 2. An energy storage module 14 is shown as associated with microgrid 12 (module 14 may, in fact, comprise a plurality of storage devices and may be configured as different specific devices, as discussed below). Energy storage module 14, in most cases, will be owned and controlled by aggregator 10. In one embodiment of the present invention, microgrid 12 may also include a stand-alone renewable generator 16, sized to serve the microgrid (that is, not a large entity for serving an industrial location, but as an additional community source).

In the embodiment illustrated in FIG. 2, a single aggregator entity 10 is shown as interacting with a pair of separate microgrids 12. It is contemplated that a single aggregator 10 may be properly configured (i.e., computer-controlled) to manage/control a plurality of microgrids 12. In accordance with the present invention, aggregator 10 includes a management control system (with, perhaps, a microprocessor or other computer-controlled arrangement) that operates upon a number of pre-defined rules (as outline below) to control the buying and selling of electricity between a utility and the residential prosumers forming the microgrids 12.

Figure 3:
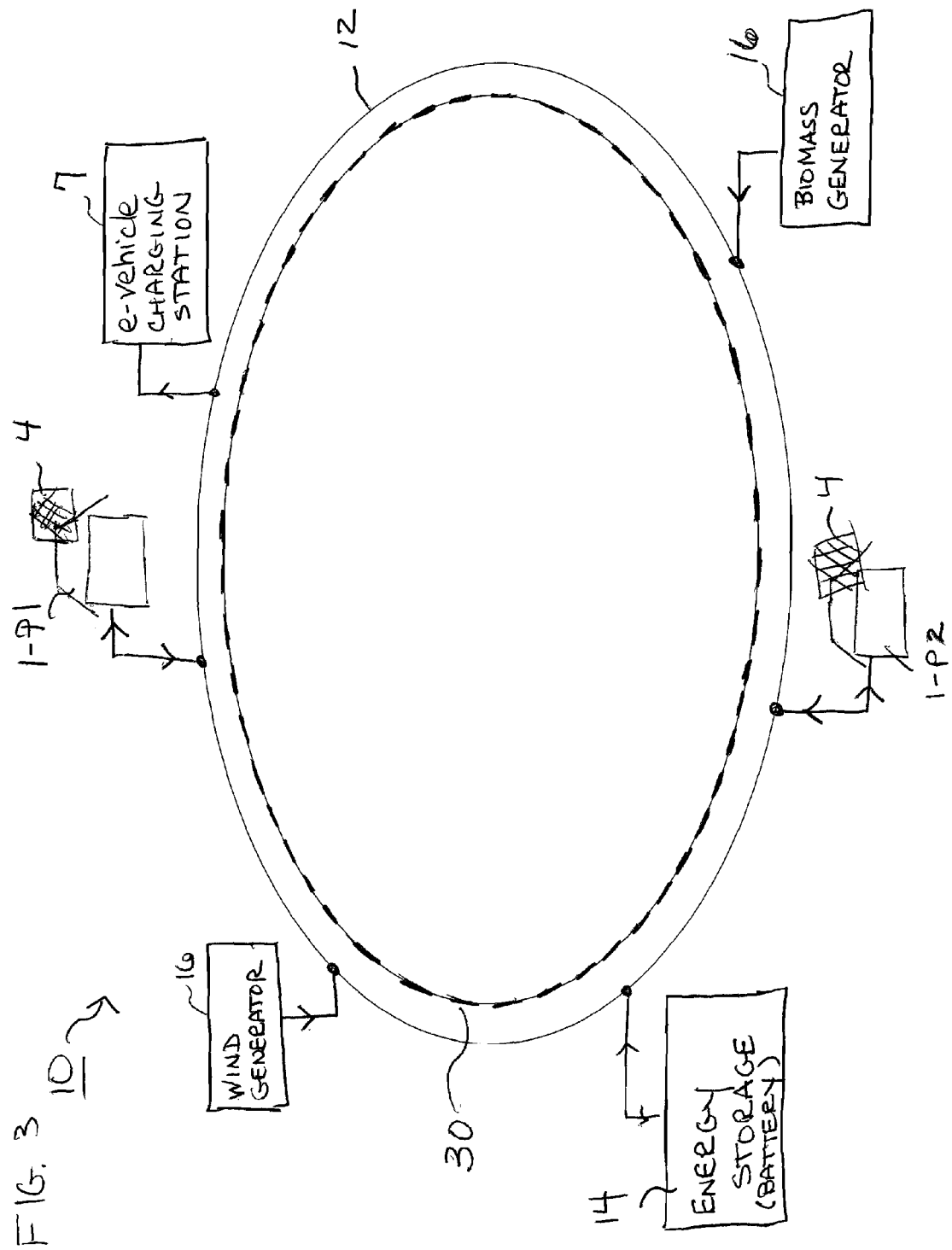
FIG. 3 illustrates the microgrid architecture of the present invention for utilizing an aggregator to communicate with one or more utility companies on behalf of a group of residential prosumers.

FIG. 3 is a high level overview diagram of an exemplary aggregator-based microgrid arrangement 10 formed in accordance with the present invention. Arrangement 10 includes a microgrid 12, where a pair of residential prosumers 1-P1 and 1-P2 are shown as coupled to microgrid 12. In one embodiment, aggregator 12 may install stand-alone renewable sources at the microgrid level, allowing for the generation of a larger supply of electricity for storage and sale to the utility. A free-standing, micro-level wind generator and biomass converter are illustrated in FIG. 3 as examples of such renewable generators 16 that are coupled to microgrid 12. A communication network 30, useful in controlling the elements connected to microgrid 12, is also shown in FIG. 3.

It is an important aspect of the present invention that microgrid 12 also have power storage capability, shown as battery 14 in FIG. 3. While shown as a "battery" it is to be understood that any suitable type(s) of storage may be utilized as part of microgrid 12. For example, fuel cells, hydro, thermal, flywheel, etc. are all well-known types of electricity storage that may be employed at the microgrid. For the purposes of the present discussion, the use of the term "battery" should be considered as exemplary only. In case of a power failure at the macrogrid level, battery 14 can provide temporary electricity for a critical residential load. Additionally, the ability to store electricity and thus provide load shifting at the microgrid level provides an economic benefit to the residences coupled to microgrid 12. The capability to shift load/store electricity at the microgrid level may also encourage the consumers to install e-car charging stations (it is possible that the e-car batteries may be used as a storage element on the microgrid, shown as element 7 in FIG. 3). The economic benefits of microgrid 12 will create interest in the residents with respect to the installation of even more renewable sources.

Indeed, by virtue of combining/storing the renewable energy produced by the various residential sources on microgrid 12, aggregator 10 provides a significant role in negotiating prices with the various utilities, adapting electricity prices according to the collective contribution of the microgrid to peak load savings, renewable production and storage.

Figure 4:
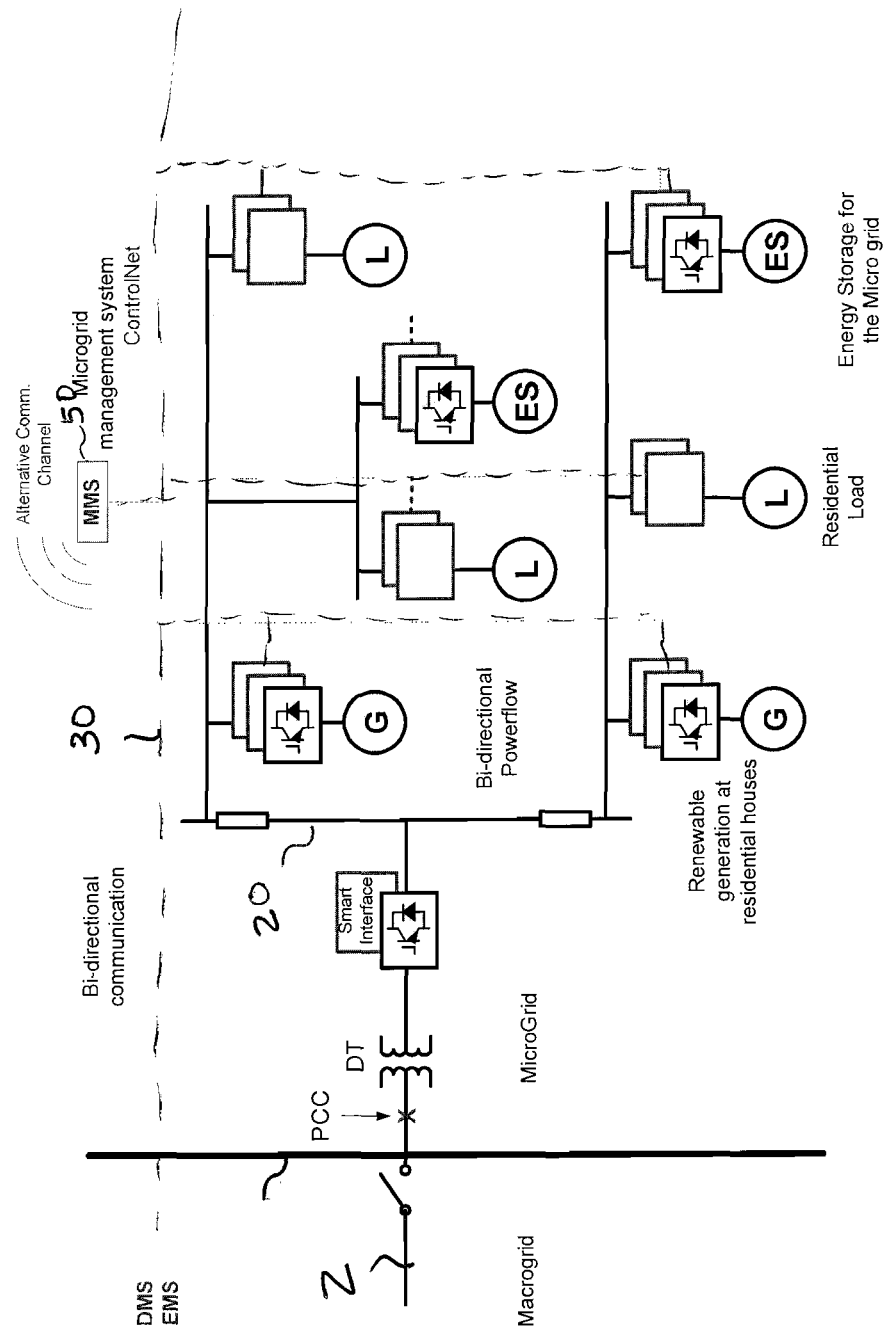
FIG. 4 is a diagram illustrating the relationship between a power flow network and a communication network in the implementation of the aggregator-based microgrid in accordance with the present invention.

FIG. 4 is a diagram illustrating the relationship between a power flow network 20 and a communication network 30 in the implementation of the residential aggregator-based microgrid 12 of the present invention. In this diagram, residential loads L, renewable generation sources G (such as solar panels 4) and energy storage units ES (such as batteries 14) are shown as connected along power flow network 20 and ultimately connected to macrogrid 2. Communication network 30 is shown as an overlay on power flow network 20 and communicates with a smart interface unit 32 associated with each element on microgrid 12. The communications forming network 30 are shown by dotted lines in FIG. 4. A microgrid management system 50 is also shown in FIG. 4, where this system is programmed to perform the aggregator functions based upon a set of rules described below. Control system 50, in one embodiment, includes computer readable medium for storing a set of instructions for implementing these rules.

One embodiment of the present invention is applicable to a "single owner-multiple renter" residential model, where there is generally a single authority that owns a number of apartments, managing and renting them to individual families. In these arrangements, the number of households may vary from less than 100 families to upwards of 1000 or more families. In this arrangement, each renter generally has an individual contract with the utility company, paying directly for his own consumption. The owner of the larger community may install renewable sources (e.g., rooftop solar cells or the like), but the individual renters are not able to implement such features. The average electricity load for each household may vary from 4 to 5 kW. Thus, for a 1000-family community, the total load may approach 5 MW.

In accordance with the present invention, this apartment complex may be defined as its own microgrid, with an aggregator acting on behalf of the single authority that owns the complex. The size of this arrangement lends itself as a good candidate for DR and other cooperative functionalities within the microgrid.

In another embodiment of the present invention, a microgrid may be defined on the "neighborhood" level and associated with a number of single family dwellings. Similar economies apply in this case, with each household anywhere from about 5 to 10 kWh. Unlike the single owner-multiple renter model, the individual homeowners may each have the capability to install their own renewable generation sources and provide some amount of electricity back to the microgrid.

In general, several rules have been developed that provide the business model for use by the aggregator in managing the microgrid arrangement of the present invention. As described above, the rules may be embodied as a set of instructions stored within a general purpose or special purpose computer (or other computer readable medium) formed as part of the aggregator management control system. The following definitions are used in these rules:

Electricity price charged by the utility to the prosumer=$P_{prosumer}^{utility}$ Electricity price charged by the utility to the aggregator=$P_{aggregator}^{utility}$ Renewable electricity price that utility pays to the prosumer=$P_{utility}^{prosumer}$ Electricity price charged by the aggregator to the prosumer=$P_{prosumer}^{aggregator}$ Renewable electricity price that aggregators pays to the prosumer=$P_{aggregator}^{prosumer}$ Renewable electricity price that utility pays to the aggregators without DR=$P\_No\_DR_{utility}^{aggregator}$ Renewable electricity price that utility pays to the aggregators during DR=$P\_DR_{utility}^{aggregator}$ Electricity price paid by aggregator2 to buy from aggregator1=$P_{aggregator\,2}^{aggregator1}$ Electricity price paid by aggregator 1 to buy from aggregator 2=$P_{aggregator1}^{aggregator\,2}$ REC cost received for renewable electricity generations one megawatt-hour (MWh)=$REC^{1-mwh}$.

Based on these definitions, the following rules are preferably implemented by the aggregator:

$P_{utility}^{prosumer} < P_{aggregator}^{prosumer}$: the prosumer point of view, the price of the renewable electricity received from the aggregator needs to be greater than the price the prosumer would otherwise directly receive from the utility.

$P_{prosumer}^{utility} \geq P_{prosumer}^{aggregator}$: From the prosumer point of view, the electricity price from the aggregator cannot be more than the price they were paying to the utility (or at that particular time other houses who are not participating in the aggregator model are paying to the utility).

$P_{prosumer}^{utility} \geq P_{aggregator}^{utility}$: From the aggregator point of view, the electricity price from the utility must be at least similar to what an individual prosumer pays to receive power from the utility.

$P\_DR_{utility}^{aggregator} > P\_No\_DR_{utility}^{aggregator}$: From the aggregator point of view, the price of electricity that the aggregator sells to the utility during peak load time must be higher than the normal flat price that the utility pays to the aggregator. In general, there must be a predictive model and an agreement in place between the utility and the aggregator to decide on the peak load amount for feed-in electricity during DR and the normal feed-in electricity.

$P_{utility}^{prosumer} \leq P\_No\_DR_{utility}^{aggregator}$: From the aggregator and prosumer point of view, both receive the same price with/without aggregator presence from the utility for their produced additional electricity. Regulation will monitor that the utility does not obstruct the aggregator business. In accordance with the present invention, everybody will benefit from the proposed model $P_{aggregator\,1}^{aggregator2} \geq P_{aggregator\,2}^{aggregator1}$: From the aggregator point of view, it might be also possible to trade electricity among neighboring aggregators.

Using these definitions and rules, it is clear that implementing a microgrid with a residential aggregator benefits a local utility company by virtue of encouraging the installation of renewable energy sources and reducing their investments in new installations. Indeed, with the on-going incentives in various countries encouraging "green" energy sources, an ever-increasing number of renewable sources will be deployed by a variety of customers, including residential customers (all improving the financial incentives for utilities to become involved in the aggregator-based microgrid structure of the present invention).

The inclusion of a residential aggregator in the network between the utility and residential customer creates another entity that can store electricity for use by residents on the microgrid in cases of overload or fault conditions on the macrogrid. It is to be understood that in its most general implementation, there may be multiple utility companies that do business with the aggregator/microgrid, where each utility has its own pricing structure.

The economic benefits to the aggregator entity are described in detail herein below for a variety of different scenarios. In each case, it is assumed that there are n residential prosumers coupled to a microgrid, with each residential prosumer consuming k kWh of electricity per day. Presuming that each residential customer can produce k' kWh during the same 24-hour period, the microgrid is able to sell back to the utility and/or store (n×k') kWh.

In one case, it is presumed that there is no opportunity to sell the power back to the utility. In this scenario, the aggregator will store the generated electricity and thereafter use it during load shifting (or as a primary source during a macrogrid outage). Presuming that the generated electricity k' is less than k and defining k" as the fraction of produced renewable energy that is supplied to the prosumer (in this case, k'=k"), then the economic benefit of the aggregator-microgrid arrangement to the aggregator can be expressed as follows:

$$\text{Benefit}=n\times((k\times P_{prosumer}^{aggregator})-(k'\times P_{aggregator}^{prosumer})-((k-k'')\times P_{aggregator}^{utility}))$$

Modifying this scenario to include the ability of the aggregator to participate in a DR program, defining k" as that fraction of produced renewable energy that is supplied to the prosumer from the microgrid's storage facility and defining EDR as that fraction of generated renewable energy that is sold back to the utility during DR, then k'=k"+EDR (EDR<k), and the aggregator's economic benefit can be defined by:

$$\text{Benefit}=n\times((k\times P_{prosumer}^{aggregator})-(k'\times P_{aggregator}^{prosumer})-((k-k'')\times P_{aggregator}^{utility}))+(EDR\times P\_DR_{utility}^{aggregator})$$

In a slightly different scenario, it may be the case that the aggregator is not participating in a DR program, but does sell back a fraction of the generated electricity to the utility. In this model, it is presumed that k″ is the fraction of the generated electricity that is sold back to the utility at its regular price (as opposed to the higher price commanded in a DR program). The economic benefit to the aggregator in this case is defined by:

$$\text{Benefit} = n \times ((k \times P_{prosumer}^{aggregator}) - (k' \times P_{aggregator}^{prosumer}) - (k'' \times P\_\text{No}\_\text{DR}_{utility}^{aggregator})).$$

This approach may be best in situations where the renewable energy produced by the consumers is relatively low with respect to their consumption (i.e., k'<k).

In the most profitable model for the aggregator, the microgrid has storage capability (and can therefore utilize load shifting) and the aggregator participates in a DR program with a fraction k″ of produced renewable electricity being fed back to the utility during Demand Response. In this case, the benefit is defined as follows:

$$\text{Benefit} = n \times ((k \times P_{prosumer}^{aggregator}) - (k' \times P_{aggregator}^{prosumer}) + (k'' \times P\_\text{DR}_{utility}^{aggregator})).$$

In the case where the aggregator has installed additional renewable electricity generation sources within the microgrid, additional electricity can be fed into the grid and the benefit increases to:

$$\text{Benefit} = n \times [(k \times P_{prosumer}^{aggregator}) - (k' \times P_{aggregator}^{prosumer}) + (k'' \times P\_\text{DR}_{utility}^{aggregator})] + (\text{REC}^{1-mwh}),$$

where REC is defined as Renewable Energy Credits, a government program where when a renewable facility generates one megawatt-hour of power, it equates to one renewable energy credit. Indeed, the addition of microgrid-based renewable electricity generation sources in any of the scenarios described above results in an additional economic benefit of $(n \times \text{REC}^{1-mwh})$.

Summarizing, it has been found that the formation of an electric microgrid based on using an aggregator as an interface between the utility and prosumers will allow for residential customers to participate in bi-directional electricity flow in a more efficient and cost-effective manner than now possible. By virtue of include electricity storage at the microgrid, the prosumers benefit from increased reliability in the delivery of electricity (during failure of the macrogrid) and load shifting for off-peak conditions. Indeed, all consumers coupled to an aggregator-based microgrid will have an incentive to install additional renewable energy sources and continue to save on their utility bills. By pooling the kWh of electricity produced by renewable generation sources at the individual prosumers, the aggregator is able to negotiate preferred rates with the utility company (or companies) and also participate in DR programs, providing additional financial benefits to the prosumer.

The foregoing description and drawings comprise illustrative embodiments of the present invention. Having thus described exemplary embodiments of the present invention, it should be noted by those skilled in the art that these disclosures are exemplary only, and that various other alternatives, adaptations and modifications may be made within the scope of the present invention. Therefore, it is to be understood that the invention is not to be limited to the specific embodiments disclosed and the modifications and embodiments are intended to be included within the scope of the appended claims.

What is claimed is:

1. An electricity microgrid for controlling electricity flow between a plurality of residential consumers and at least one utility company, the microgrid comprising:
   at least one renewable generation source for generating electricity at the microgrid;
   means for storing at least a fraction of the generated electricity at the microgrid; and
   an aggregator entity connected with the at least one generation source, the storing means, the plurality of residential consumers and the at least one utility company, at least some of the residential consumers being prosumers including renewable generation sources, the aggregator entity including a processor and non-transitory computer-readable media having stored thereon computer readable instructions, wherein execution of the computer readable instructions by the processor causes the processor to perform operations comprising purchasing electricity from the at least one utility for distribution to the plurality of residential consumers connected to the microgrid and pooling the electricity generated by the at least one renewable generation source, the aggregator utilizing a rules-based mechanism to perform the purchasing of electricity;
   wherein the rules-based mechanism includes the following rules:
      an electricity price charged by a prosumer to the utility is less than an electricity price charged by the prosumer to the aggregator;
      an electricity price charged by the utility to the prosumer is greater than or equal to an electricity price charged by the aggregator to the prosumer;
      an electricity price charged by the utility to the prosumer is greater than or equal to an electricity price charged by the utility to the aggregator;
      an electricity price paid by the utility to the aggregator during a Demand Response program is greater than an electricity price paid by the utility to the aggregator without a Demand Response program;
      an electricity price charged by the prosumer to the utility is less than or equal to an electricity price paid by the utility to the aggregator without a Demand Response program; and
      an electricity price paid by a second aggregator entity to buy from a first aggregator entity is greater than or equal to an electricity price paid by the first aggregator entity to buy from the second aggregator entity.

2. An electricity microgrid as defined in claim 1 wherein the aggregator is further configured to sell at least a portion of the electricity generated by the microgrid to a utility.

3. An electricity microgrid as defined in claim 2 where the generated electricity is sold to the utility as part of a Demand Response (DR) program.

4. An electricity microgrid as defined in claim 1 wherein the at least one renewable generation source includes a plurality of renewable generation sources installed at residences of a plurality of residential consumers, the plurality of residential consumers defined as residential prosumers.

5. An electricity microgrid as defined in claim 1 wherein the at least one renewable generation source includes a stand-alone renewable generation source installed along the microgrid and controlled by the aggregator entity.

6. A method of controlling a bi-directional flow of electricity between a utility company and a plurality of residential consumers, at least a subset of the plurality of residential consumers including renewable sources for generating electricity, the method including:
   creating an electric microgrid interconnecting the plurality of residential consumers;
   installing electricity storage means at the microgrid; and providing an aggregator at the microgrid including a processor and non-transitory computer-readable media having stored thereon computer readable instructions, wherein execution of the computer readable instructions by the processor causes the processor to perform operations comprising: controlling buying and selling of electricity to the utility company on behalf of the plurality of residential consumers utilizing a rules-based mechanism to control the buying and selling of electricity, at least some of the residential consumers being prosumers including renewable generation sources;

wherein the rules-based mechanism includes the following rules:

an electricity price charged by a prosumer to the utility is less than an electricity price charged by the prosumer to the aggregator;

an electricity price charged by the utility to the prosumer is greater than or equal to an electricity price charged by the aggregator to the prosumer;

an electricity price charged by the utility to the prosumer is greater than or equal to an electricity price charged by the utility to the aggregator;

an electricity price paid by the utility to the aggregator during a Demand Response program is greater than an electricity price paid by the utility to the aggregator without a Demand Response program;

an electricity price charged by the prosumer to the utility is less than or equal to an electricity price paid by the utility to the aggregator without a Demand Response program; and an electricity price paid by a second aggregator entity to buy from a first aggregator entity is greater than or equal to an electricity price paid by the first aggregator entity to buy from the second aggregator entity.

7. The method as defined in claim 6 wherein the aggregator pools the electricity generated by the subset of the plurality of residential consumers and sells the pooled electricity to the utility company as part of a Demand Response program.

8. The method as defined in claim 6 wherein the aggregator is configured to control the electricity storage means and allow for stored electricity to be sold to separate ones of the plurality of residential consumers during power outage or as part of a load shifting program.

* * * * *